(12) United States Patent
Maeda et al.

(10) Patent No.: US 8,006,671 B2
(45) Date of Patent: Aug. 30, 2011

(54) START CONTROL APPARATUS FOR AN INTERNAL COMBUSTION ENGINE

(75) Inventors: Osamu Maeda, Chiyoda-ku (JP); Hideki Takubo, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 412 days.

(21) Appl. No.: 12/354,936

(22) Filed: Jan. 16, 2009

(65) Prior Publication Data

US 2009/0314260 A1    Dec. 24, 2009

(30) Foreign Application Priority Data

Jun. 18, 2008 (JP) ................................. 2008-159518

(51) Int. Cl.
*F02D 41/06* (2006.01)
*F02M 51/00* (2006.01)
*F02M 31/00* (2006.01)

(52) U.S. Cl. .................... 123/491; 123/179.21; 123/543; 701/113

(58) Field of Classification Search .................. 123/491, 123/543, 558, 179.15, 179.21; 701/113
See application file for complete search history.

(56) References Cited

U.S. PATENT DOCUMENTS

| | | | | |
|---|---|---|---|---|
| 5,038,730 A | * | 8/1991 | Kashima | .................. 123/179.21 |
| 2010/0132680 A1 | * | 6/2010 | Iwahashi | ....................... 123/697 |

FOREIGN PATENT DOCUMENTS

| | | | |
|---|---|---|---|
| JP | 03-070852 A | | 3/1991 |
| JP | 05-086917 A | | 4/1993 |
| JP | 05-149223 A | | 6/1993 |
| JP | 6-129243 A | * | 5/1994 |
| JP | 06-307270 A | | 11/1994 |
| JP | 06-323213 A | | 11/1994 |
| JP | 2002-004918 A | | 1/2002 |

OTHER PUBLICATIONS

Japanese Office Action dated May 11, 2010 in corresponding Japanese Patent Application No. 2008-159518.

* cited by examiner

*Primary Examiner* — Hieu T Vo
(74) *Attorney, Agent, or Firm* — Sughrue Mion, PLLC

(57) ABSTRACT

A start control apparatus for an internal combustion engine, which takes an amount of a fuel vaporized from a heated fuel into consideration to prevent deterioration of startability due to an overrich or overlean condition caused by an excessive or insufficient amount of the vaporized fuel and to realize improvement of cold startability. The start control apparatus includes: a heater (14) for heating a fuel to be supplied to the internal combustion engine; fuel heating control unit (22) for energizing the heater when a cooling water temperature is less than an internal combustion engine start possible water temperature value to heat the fuel; and start time fuel setting unit (26) for setting a start time fuel injection amount of the internal combustion engine according to a fuel temperature after the fuel is heated by the fuel heating control unit (22), an alcohol concentration, and the cooling water temperature.

8 Claims, 4 Drawing Sheets

START CONTROL APPARATUS FOR AN INTERNAL COMBUSTION ENGINE

BACKGROUND OF THE INVENTION

1. Field of the Invention

The present invention relates to a start control apparatus for an internal combustion engine, for controlling fuel injection at a cold start of the internal combustion engine.

2. Description of the Related Art

For starting an internal combustion engine (hereinafter, also referred to simply as an "engine") at low temperature, it is difficult to ensure stable starting performance because a fuel is unlikely to be volatilized for a fuel temperature and an atmospheric temperature which are both low. Moreover, since a large amount of fuel must be injected at the engine start, an exhaust gas problem disadvantageously becomes more serious.

Recently, with growing concern about air pollution, changes in oil situation, and the like, alcohol has attracted attention as an alternative fuel for gasoline. For example, a flexible fuel vehicle (FFV) using a blend fuel of ethanol and gasoline (0% to 100% ethanol) has been put into practical use. However, in general, alcohol is less volatile at low temperature than gasoline. Therefore, for the engine start at low temperature, the deterioration of cold startability and the deterioration of the amount and quality of the exhaust gas when a fuel having a high alcohol concentration such as ethanol 100% (E100) is used become particularly problematical.

For improving the cold startability and improving the amount and quality of the exhaust gas, the following method is known. According to the method, a fuel is warmed by a heater provided inside an injector or to a fuel pipe or an intake port to promote the volatilization of the fuel. Thereafter, the fuel is used for combustion in the engine.

Moreover, for example, Japanese Patent Application Laid-open No. Hei 3-070852 (hereinafter, referred to as Patent Document 1) discloses a starter auxiliary device of an alcohol engine, which includes start possibility judging unit, necessary calorific value calculating unit, and start control unit. The start possibility judging unit judges based on an alcohol concentration of a fuel and an engine temperature whether or not the engine can be started. The necessary calorific value calculating unit calculates a necessary calorific value of heating unit for promoting the vaporization of the fuel to allow the engine to be started based on the alcohol concentration and the engine temperature when the start possibility judging unit judges that the engine cannot be started. The start control unit compares the necessary calorific value calculated by the necessary calorific value calculating unit and a predetermined reference value, and energizes the heating unit for a predetermined period of time when the necessary calorific value is larger than the reference value to then drive a starter motor.

Further, Japanese Patent Application Laid-open No. Hei 5-086917 (hereinafter, referred to as Patent Document 2) discloses a start control method of an engine for an FFV. The disclosed start control method includes the steps of: obtaining a start time increment coefficient from an engine temperature at the engine start and a concentration of alcohol in a fuel; obtaining an intake air temperature correction coefficient from a difference between the engine temperature and an intake air temperature, and the alcohol concentration; obtaining a fuel temperature correction coefficient from a difference between the engine temperature and a fuel temperature, and the alcohol concentration; and comparing a start possibility judgment value with a value obtained by multiplying the start time increment coefficient, the intake air temperature correction coefficient, and the fuel temperature correction coefficient, and starting energizing heating unit provided in a fuel injection direction of an injector when the value obtained by the multiplication is larger than the start possibility judgment value.

According to the conventional methods, however, the start possibility judgment or the necessity of heating, and further, for example, the fuel injection amount is obtained based on states such as a cooling water temperature and the fuel temperature before the fuel is heated. Therefore, the judgment of the necessity of heating or the setting of the fuel injection amount, which is suitable for a fuel volatility varying depending on a fuel heating temperature, is not performed. Accordingly, an overrich condition is caused by the excessive vaporization of the fuel to deteriorate a combustion state, or an overlean condition is caused by the insufficient vaporization of the fuel to deteriorate the combustion. As a result, the startability is adversely deteriorated.

Moreover, although a fuel injection amount is reduced while the fuel is being heated in the above-mentioned conventional methods, the amount of reduction is fixed, and therefore the fuel injection amount suitable for the fuel volatility varying depending on the fuel heating temperature is not set. As a result, the overrich or overlean condition is caused to deteriorate the combustion, which in turn adversely deteriorates the startability.

Further, at engine restart after the injection of a heated fuel but with an unsuccessful engine start, the volatile state of the fuel in an intake port and a cylinder is ameliorated. Therefore, if the same amount of the heated fuel as that for the first engine start is injected for the engine restart, the vaporization of the fuel becomes excessive to put the engine into the overrich condition. As a result, the startability is adversely deteriorated.

SUMMARY OF THE INVENTION

The present invention is devised to solve the problems as described above, and has an object of providing a start control apparatus for an internal combustion engine, which takes the amount of a fuel vaporized from a heated fuel into consideration to prevent the deterioration of startability due to an overrich or overlean condition caused by an excessive or insufficient amount of the vaporized fuel and to realize the improvement of cold startability.

Further, the present invention has another object of providing the start control apparatus for the internal combustion engine, which reduces a fuel injection amount at restart for cold restart to prevent the deterioration of startability due to the overrich condition.

The present invention provides a start control apparatus for an internal combustion engine, including: a heater for heating a fuel to be supplied to the internal combustion engine; fuel heating control means for energizing the heater when a cooling water temperature is less than an internal combustion engine start possible water temperature value to heat the fuel; and start time fuel setting means for setting a start time fuel injection amount of the internal combustion engine according to a fuel temperature after the fuel is heated by the fuel heating control means, an alcohol concentration, and the cooling water temperature.

According to the start control apparatus for the internal combustion engine of the present invention, the fuel is heated by using the heater at a cold start. The fuel injection amount is set according to the temperature of the heated fuel, the cooling water temperature, and the alcohol concentration. A suitable fuel injection amount is set in consideration of the amount of the fuel vaporized from the heated fuel. In this manner, the deterioration of startability caused by an overrich or overlean condition due to an excessive or insufficient amount of the vaporized fuel can be prevented to realize the improvement of the cold startability. Further, the fuel injection amount at the restart is corrected to be reduced according to the start time fuel injection amount at the previous start, the fuel temperature after the fuel is heated at the restart, and the cooling water temperature at the restart. In this manner, the prevention of the deterioration of the startability due to the overrich condition can be realized. As a result, the amount of energy consumption, and noxious and toxic substances can be reduced.

DETAILED DESCRIPTION OF THE PREFERRED EMBODIMENT

The present invention provides a start control apparatus for an internal combustion engine, which sets a fuel injection amount according to a fuel temperature after heating, a cooling water temperature, and an alcohol concentration to set a suitable fuel injection amount in consideration of the amount of a fuel vaporized from the heated fuel, thereby preventing the deterioration of startability due to an overrich or overlean condition caused by an excessive or insufficient amount of a vaporized fuel, and realizing the improvement of cold startability.

Moreover, the present invention provides the start control apparatus for the internal combustion engine, which makes a correction so as to reduce the fuel injection amount at restart according to the heated fuel injection amount at the previous start and the water temperature to prevent the deterioration of startability due to the overrich condition for cold restart.

First Embodiment

Figure 1:
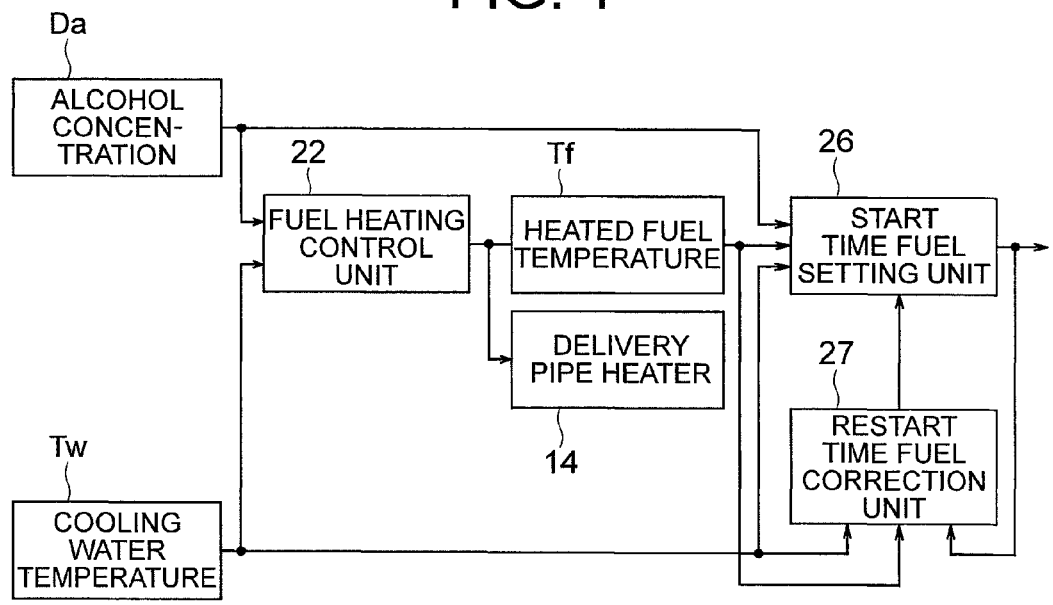
FIG. 1 is a block diagram illustrating a functional configuration of a principal part of a start control apparatus for an internal combustion engine according to an embodiment of the present invention.
Figure 2:
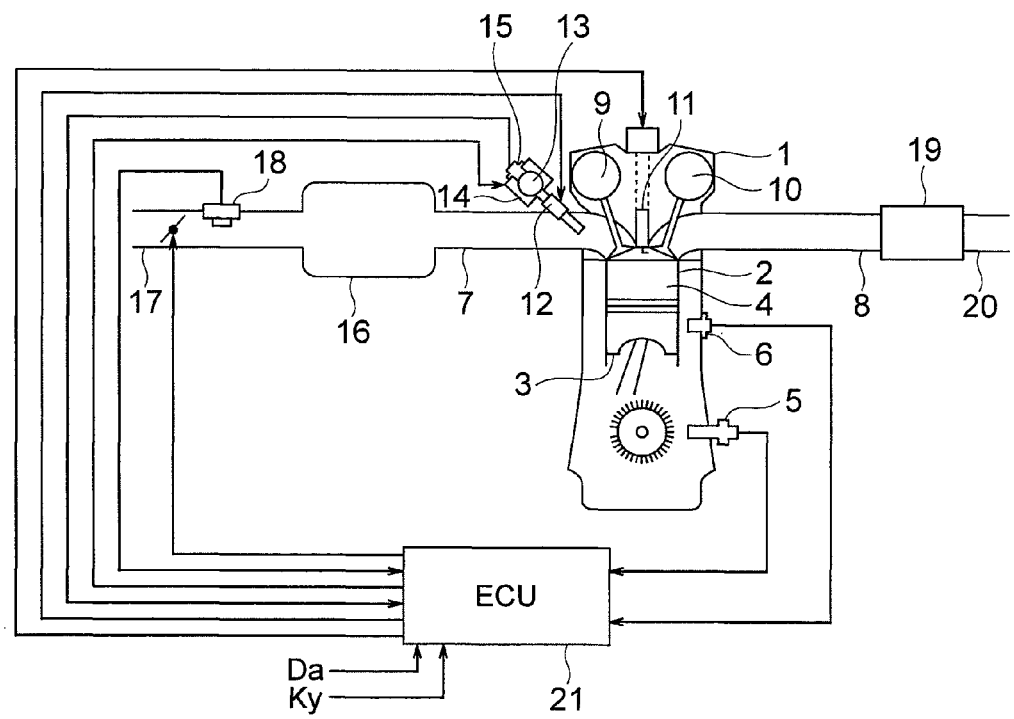
FIG. 2 is a configuration diagram illustrating an entire control system of the internal combustion engine, which includes the start control apparatus for the internal combustion engine illustrated in FIG. 1.

FIG. 1 is a block diagram illustrating a functional configuration of a principal part of a start control apparatus for an internal combustion engine according to an embodiment of the present invention. FIG. 2 is a configuration diagram illustrating an entire control system of the internal combustion engine, which includes the start control apparatus for the internal combustion engine illustrated in FIG. 1. Although the internal combustion engine (hereinafter, referred to simply as an "engine") is generally provided with a plurality of cylinders 2, one of the plurality of cylinders 2 is illustrated in FIG. 2.

In FIG. 2, a combustion chamber 4 is formed in the engine 1 by the cylinder 2 having a cylindrical shape and a piston 3. A mixture of a fuel and air is sucked into the combustion chamber 4 to be combusted therein. The piston 3 moves reciprocatably in an axial direction of the cylinder 2. A crank angle sensor 5 for generating a signal in synchronization with the rotation of the engine 1 is provided to a crank shaft 5a. A water temperature sensor 6 for outputting a voltage according to a temperature of cooling water (not shown) for cooling the engine 1 is provided to the cylinder 2.

An intake manifold 7 for sucking air into the cylinder 2 and an exhaust manifold 8 for exhausting an exhaust gas generated by the combustion of the mixture in the combustion chamber 4 are connected to the cylinder 2. An intake valve 9 which opens/closes between the combustion chamber 4 and the intake manifold 7 and an exhaust valve 10 which opens/closes between the combustion chamber 4 and the exhaust manifold 8 are mounted to the cylinder 2. At the top of the cylinder 2, an ignition plug 11 for igniting the mixture supplied to the combustion chamber 4 is mounted.

On the downstream side of the intake manifold 7 and in the vicinity of the intake valve 9, an injector 12 for injecting the fuel is mounted. The injector 12 enables the fuel to be supplied into the cylinder 2 at optimal timing.

The fuel passes through a fuel pipe (not shown) to be supplied to the injector 12 of each cylinder by a delivery pipe 13. A delivery pipe heater 14 is mounted inside or outside of the delivery pipe 13 to allow the fuel in the delivery pipe 13 to be heated. In this manner, the fuel in the delivery pipe 13 can be heated. Moreover, a fuel temperature sensor 15 for outputting a voltage according to a temperature of the fuel in the delivery pipe 13 is provided.

On the upstream side of the intake manifold 7, a surge tank 16 for temporarily storing the air sucked into the combustion chamber 4 is connected. On the upstream side of the surge tank 16, a throttle valve 17 is connected. On the downstream side of the throttle valve 17, a boost pressure sensor 18 for outputting a voltage according to a boost pressure is provided.

On the downstream side of the exhaust manifold 8, a catalytic device 19 for removing a noxious substance in the exhaust gas is connected. On the downstream side of the catalytic device 19, a tail pipe 20 for exhausting the exhaust gas to the outside is connected.

An electronic control unit 21 for engine control (hereinafter, abbreviated as an ECU 21) includes a microcomputer (not shown) including a CPU, a ROM, a RAM, and a backup RAM (the ROM, the RAM, and the backup RAM are grouped to form a storage section), a drive circuit (not shown), and an I/O interface (not shown). The CPU performs computational processing. The ROM stores program data and fixed value data. Data stored in the RAM is updated to be sequentially rewritten. The backup RAM retains stored data even when the ECU 21 is powered OFF. The drive circuit serves to drive an actuator. The I/O interface performs the input/output of various signals.

Software (programs and the like) for executing various functions including fuel heating control unit 22, start time fuel setting unit 26, and restart time fuel correction unit 27 (see FIG. 1 for each) is stored in the ROM of the ECU 21.

In the ECU 21, voltage output values from the water temperature sensor 6 and the fuel temperature sensor 15 are subjected to A/D conversion at the I/O interface to be input to the microcomputer. The output values, which are subjected to the A/D conversion, are respectively used as a cooling water temperature Tw and a fuel temperature Tf in each of the above-mentioned units. Moreover, an interrupt input of a signal from the crank angle sensor 5 is performed to the ECU 21. In the ECU 21, an engine revolution number Ne is computed from a built-in timer (not shown) and the signal from the crank angle sensor 5 to be used for computations during and after the engine start. Moreover, a voltage output value from the boost pressure sensor 18 is subjected to A/D conversion to be input to the ECU 21. The output value, which is subjected to the A/D conversion, is used for the computation after the engine start as a cool boost pressure Pb.

Besides, for example, an output value obtained by A/D conversion of a voltage output value from an alcohol concentration sensor (not shown) or a value according to an error in an air-fuel ratio computed from an output value from an oxygen sensor (not shown) provided in an assembly portion of the exhaust pipe 8 is used as an alcohol concentration Da in the ECU 21. Moreover, for example, a key ON signal Ky from a key cylinder or the like is input to the ECU 21 to be used for judging that the key is ON or is immediately after being turned ON.

In the start control apparatus for the internal combustion engine illustrated in FIG. 1, the fuel heating control unit 22 compares an engine start possible water temperature value $T_{DP}$ and the cooling water temperature Tw, which are preset according to the alcohol concentration Da, with each other from information of the alcohol concentration Da and the cooling water temperature Tw. When the fuel heating control unit 22 judges that the cooling water temperature Tw is less than the engine start possible water temperature value $T_{DP}$ at the current alcohol concentration Da, the delivery pipe heater 14 is energized to heat the fuel during a heater ON duration time $TI_{oc}$ which is preset according to the cooling water temperature Tw and the alcohol concentration Da. When the fuel heating control unit 22 judges that the cooling water temperature Tw is equal to or larger than the engine start possible water temperature value $T_{DP}$ at the current alcohol concentration Da, the delivery pipe heater 14 is not energized. The engine start possible water temperature value $T_{DP}$ according to the alcohol concentration Da is set to become larger as the alcohol concentration Da increases.

The start time fuel setting unit 26 corrects a basic injection amount Pc preset according to the cooling water temperature Tw with an alcohol correction coefficient Pa preset according to the alcohol concentration Da and a heated fuel temperature correction coefficient Pk preset according to the heated fuel temperature Tf based on information of the alcohol concentration Da, the cooling water temperature Tw, and the heated fuel temperature Tf corresponding to a temperature of the fuel heated by the delivery pipe heater 14 when the engine is started at low temperature and the fuel is heated by the fuel heating control unit 22. In this manner, a start time fuel injection amount Pt is computed.

The restart time fuel correction unit 27 corrects the start time fuel injection amount Pt computed by the start time fuel setting unit 26 with the start time fuel injection amount Pt by the start time fuel setting unit 26 at the previous start, the heated fuel temperature correction coefficient Pk set according to the heated fuel temperature Tf, and a restart time correction coefficient Pr set according to the cooling water temperature Tw based on information of the cooling water temperature Tw, the heated fuel temperature Tf, and the start time fuel injection amount Pt of the start time fuel setting unit 26 when the engine is restarted at low temperature and the fuel is heated by the fuel heating control unit 22. In this manner, the start time fuel injection amount Pt at the restart (restart time fuel injection amount Pt') is computed.

For preset relations between factors described above and below which are necessary for control (for example, relation between the alcohol concentration Da and the engine start possible water temperature value $T_{DP}$, and the like), conversion information including a function, a complex function, a table, a list or the like is prestored in the ROM. Then, a necessary value is obtained based on the conversion information. Moreover, various coefficients (for example, restart time correction coefficient Pr or the like) and computed values (for example, start time fuel injection amount Pt or the like) are stored in the RAM because the values of the various coefficients and the computed values are sequentially updated for use. A value which further varies and is required to be retained even when the ECU 21 is powered OFF (for example, alcohol concentration Da or the like) is stored in the backup RAM.

Hereinafter, an operation of injection control at the start is described. First, referring to a flowchart of FIG. 3, an operation of heating the fuel by the fuel heating control unit 22 and setting the start time fuel injection amount Pt (including the start time fuel injection amount Pt at the restart (restart time fuel injection amount Pt')) by the start time fuel setting unit 26 and the restart time fuel correction unit 27 is described. The operation is executed as a sub-routine during the execution of a main routine in a predetermined time cycle in the ECU 21.

Figure 3:
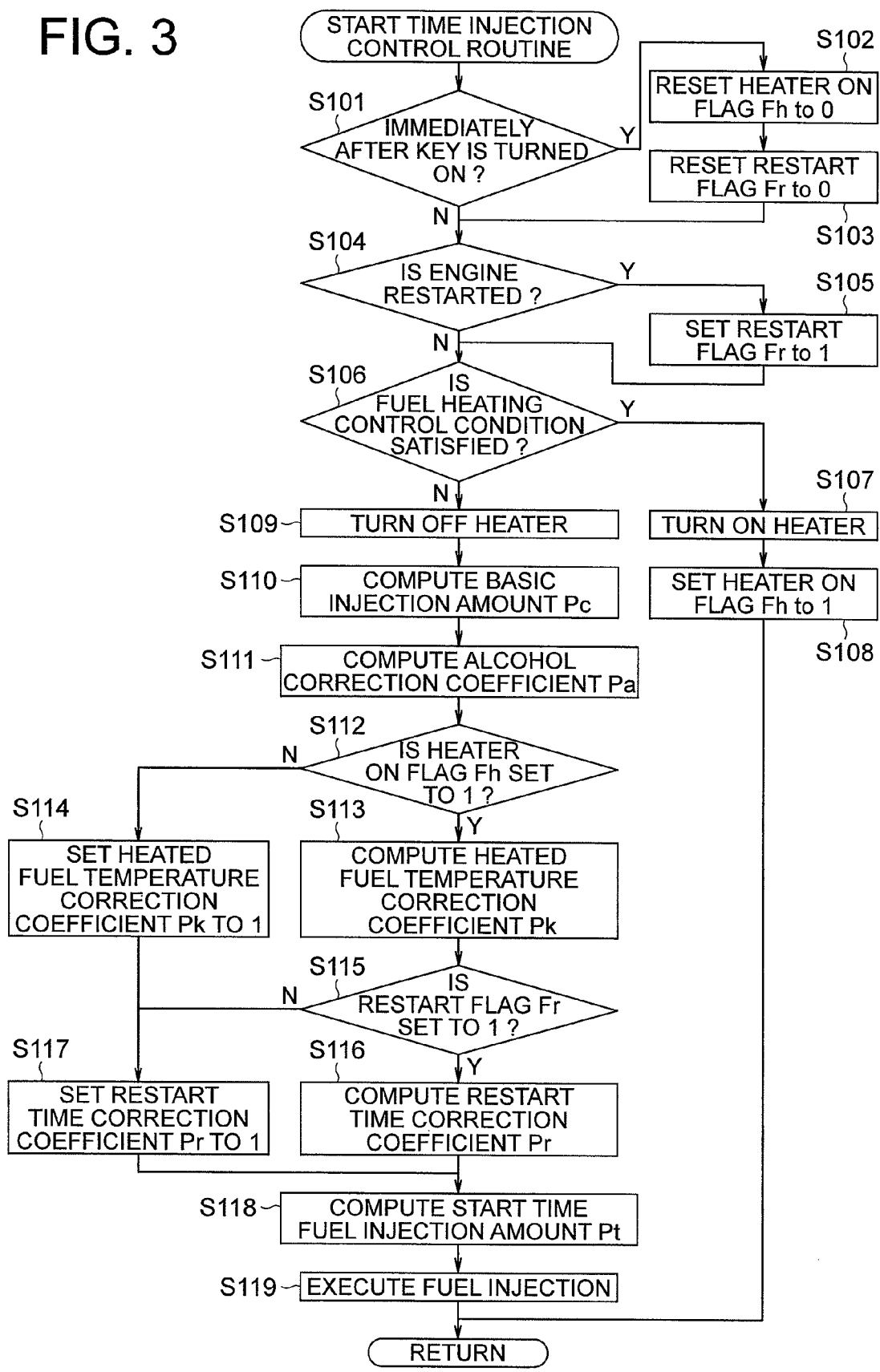
FIG. 3 is a flowchart illustrating an operation of the start control apparatus for the internal combustion engine according to the embodiment of the present invention.

First, in Step S101 illustrated in FIG. 3, it is judged based on, for example, the key ON signal Ky, the entire control of the internal combustion engine in the ECU 21 or the like whether or not the key is immediately after being turned ON. In Step S102, since the delivery pipe heater 14 is not in operation yet if the key is immediately after being turned ON, a heater ON flag Fh is reset to "0". In Step S103, since the restart is not performed yet, a restart flag Fr is reset to "0". The above-mentioned Steps S102 and S103 correspond to flag initialization processing.

Next, in Step S104, it is judged whether or not the engine is in a restart state. When the engine is not successfully started at the previous start although the fuel heating control and the fuel injection are performed to start the engine, a restart condition is satisfied. The satisfaction of the restart condition is judged from a state of each of the flags and a state of drive control of the internal combustion engine in the main routine performed in the ECU 21. When the condition is satisfied in Step S104, it is judged that the engine is being restarted. Then, the restart flag Fr is set to "1" in Step S105, and the processing proceeds to Step S106. When the condition is not satisfied in Step S104, the processing proceeds to next Step S106 without any further processing.

Next, it is judged in Step S106 whether or not a fuel heating control condition is satisfied. Specifically, it is judged whether or not the cooling water temperature Tw is less than the engine start possible water temperature value $T_{DP}$ preset according to the alcohol condition Da or whether or not the delivery pipe heater 14 is currently ON and it is currently during the heater ON duration time $TI_{oc}$ preset according to the cooling water temperature Tw and the alcohol concentration Da. The start possible water temperature value $T_{DP}$ according to the alcohol concentration Da is set to become higher as the alcohol concentration Da increases. Moreover, the heater ON duration time $TI_{oc}$ according to the cooling water temperature Tw and the alcohol concentration Da is set to become larger as the cooling water temperature Tw becomes lower and the alcohol concentration Da increases.

Here, as the heater ON duration time $TI_{oc}$, a time required for the fuel temperature Tf detected by the fuel temperature sensor 15 or the like to reach a target fuel temperature $T_T$ (stored in form of a function or a table in the storage section) set according to the cooling water temperature Tw and the alcohol concentration Da may be used. Moreover, when a positive temperature coefficient (PTC) heater is used as the delivery pipe heater 14, a resistance of the heater is varied by the temperature to change a consumption current. Therefore, an ammeter or a voltmeter (not shown) may be provided to detect the resistance or the current of the delivery pipe heater 14 to estimate the fuel temperature Tf. Then, the delivery pipe heater 14 may be kept ON until the estimated fuel temperature Tf reaches the target fuel temperature $T_T$ set according to the cooling water temperature Tw and the alcohol concentration Da.

When the fuel heating control condition is satisfied in Step S106, the delivery pipe heater 14 is turned ON in Step S107 to heat the fuel in the delivery pipe 13. After the delivery pipe heater 14 is turned ON in Step S107, the heater ON flag Fh is set to "1" in Step S108 to store the fact that the delivery pipe heater 14 is turned ON. Then, the processing returns to the main routine. On the other hand, when the fuel heating condition is not satisfied in Step S106, the delivery pipe heater 14 is turned OFF in Step S109 to stop heating the fuel in the delivery pipe 13.

Since the fuel injection is executable after the delivery pipe heater 14 is turned OFF in Step S109, the basic injection amount Pc is computed in Step S110. A value according to the cooling water temperature Tw is preset as the basic injection amount Pc. The basic injection amount Pc is set to be larger as the cooling water temperature Tw becomes lower. Next, in Step S111, the alcohol correction coefficient Pa is computed. The alcohol correction coefficient Pa at the alcohol concentration of zero is determined as a lower limit value of the alcohol correction coefficient Pa, which is set to 1. The alcohol correction coefficient Pa is set to increase from the lower limit value of 1 as the alcohol concentration Da increases.

Next, it is judged in Step S112 whether or not the heater ON flag Fh is set to "1", specifically, whether or not the delivery pipe heater 14 is turned ON in Step S107 and Step S108 has been executed. When the condition is satisfied in Step S112 (the delivery pipe heater 14 is turned ON once), the heated fuel temperature correction coefficient Pk is computed in Step S113. A value of the heated fuel temperature correction coefficient Pk when the fuel heating is not executed is determined as its lower limit value, which is set to 1 (see Step S114 described below). The heated fuel temperature correction coefficient Pk is set to increase from the lower limit value of 1 as the fuel temperature Tf becomes lower, as the cooling water temperature Tw becomes lower, and as the alcohol concentration Da increases. As the heated fuel temperature Tf becomes lower, the volatility is deteriorated. As a result, a larger fuel injection amount is required. Even at the same heated fuel temperature Tf, a temperature in the intake port (for example, in the intake manifold 7) or in the cylinder (for example, in the cylinder 2) becomes lower as the water temperature becomes lower. Therefore, the heated fuel is cooled to deteriorate the volatility. As a result, a larger fuel injection amount is required. Moreover, even at the same heated fuel temperature Tf, the volatility is deteriorated as the alcohol concentration increases. As a result, a larger fuel injection amount is required even in this case.

Here, a value estimated from the cooling water temperature Tw or a heater energization time, that is, the heater ON duration time $TI_{oc}$ may be used as the heated fuel temperature Tf. Alternatively, the heater resistance, the current, or the voltage may be detected by taking advantage of a change in the heater resistance depending on the temperature as in the case of the PTC heater to estimate the heated fuel temperature Tf for use.

Subsequently to Step S113, it is judged in Step S115 whether or not the restart flag Fr is set to "1". When the condition is not satisfied in Step S115, that is, the engine is not currently being restarted, the restart time correction coefficient Pr is set to 1 in Step 117. Thereafter, the processing proceeds to Step S118.

When the condition is satisfied in Step S115, that is, Step S105 has been executed, the restart time correction coefficient Pr is computed in Step S116. The restart time correction coefficient Pr is set to be larger than 0 and equal to or smaller than 1. The restart time correction coefficient Pr is set to be smaller as the start time fuel injection amount Pt at the previous start described below increases, as the fuel temperature Tf becomes higher, and as the cooling water temperature Tw becomes higher. Specifically, since the volatile state of the fuel in the intake port and the cylinder tends to be better as the start time fuel injection amount Pt increases, as the fuel temperature Tf becomes higher, and as the cooling water temperature Tw becomes higher. Therefore, the restart time correction coefficient Pr is set to be smaller to reduce a starting fuel amount at the restart.

When the condition is not satisfied in Step S112, the heated fuel temperature correction coefficient Pk and the restart time correction coefficient Pr are set to "1" respectively in Steps S114 and S117. As a result, the start time fuel injection amount Pt computed in Step S118 is prevented from increasing or decreasing by the heated fuel temperature correction coefficient Pk and the restart time correction coefficient Pr at normal temperature at which the delivery pipe heater 14 does not operate.

Next, the start time fuel injection amount Pt is computed in Step S118. The start time fuel injection amount Pt is computed by using the basic injection amount Pc, the alcohol correction coefficient Pa, the heated fuel temperature correction coefficient Pk, and the restart time correction coefficient Pr as expressed by Formula (1).

$$Pt = Pc \times Pa \times Pk \times Pr \qquad (1)$$

After the start time fuel injection amount Pt is computed in Step S118, the fuel injection is executed in Step S119. Then, the processing returns to the main routine.

The volatility of the fuel is ameliorated by the heated fuel. Therefore, the following method may also be adopted. The correction coefficients according to the heated fuel temperature Tf, the alcohol concentration Da, and the cooling water temperature Tw are computed until the heated fuel in the fuel pipe is no longer injected and the heated fuel adhered to the intake port is no longer sucked into the engine, for a while after the engine start. Then, until the effects of the heated fuel disappear from the engine start, the fuel injection amount is corrected.

Steps S101 to S109 correspond to the fuel heating control unit 22, whereas Steps S110 to S119 correspond to the start time fuel setting unit 26. In particular, Steps S115 to S117 correspond to the restart time fuel correction unit 27.

Figure 4:
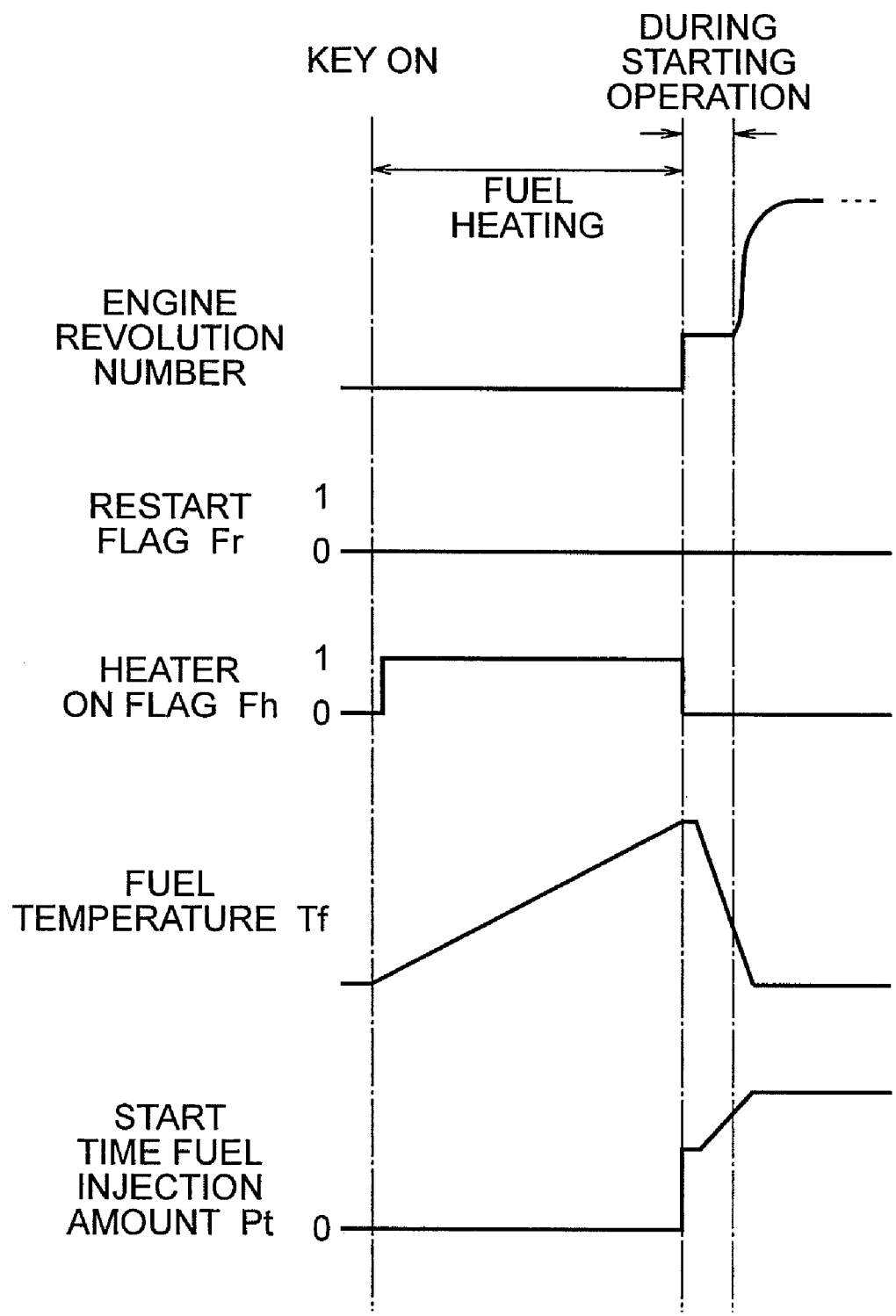
FIG. 4 is a timing chart illustrating a behavior of an operation at start, which is related to the start control apparatus for the internal combustion engine according to the embodiment of the present invention.
Figure 5:
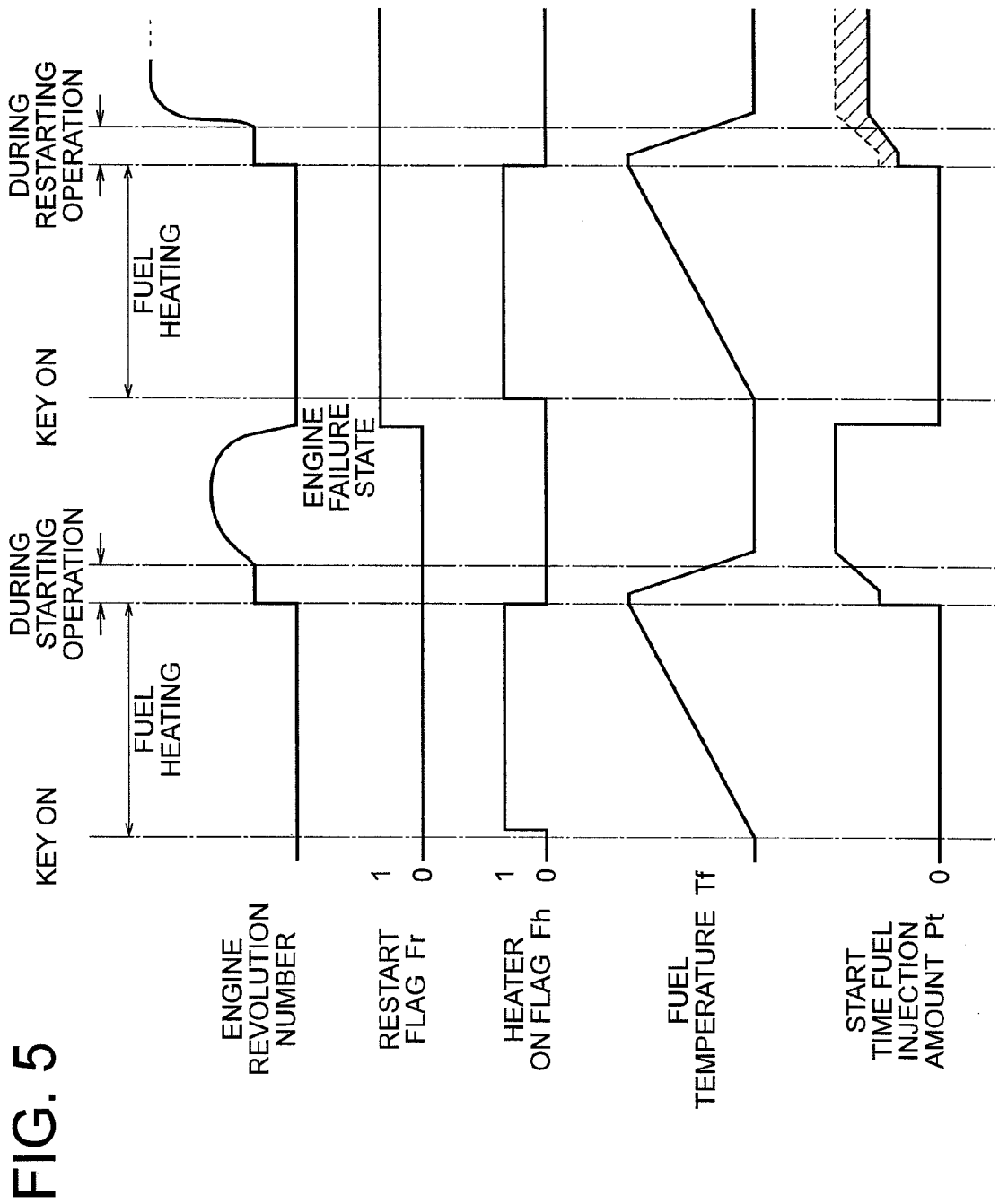
FIG. 5 is a timing chart illustrating a behavior of an operation at restart, which is related to the start control apparatus for the internal combustion engine according to the embodiment of the present invention.

An example of the cold start in the above-mentioned embodiment is described referring to timing charts of FIGS. 4 and 5. In this example, the fuel injection amount is set according to the temperature of the fuel heated by using the delivery pipe heater, the cooling water temperature, and the alcohol concentration at the cold start. Further, the fuel injection amount at the restart is corrected to be reduced according to the heated fuel injection amount at the previous start and the cooling water temperature. Each of FIGS. 4 and 5 shows a behavior when the engine is started at low temperature (for example, started at −5° C.) and a high concentration alcohol fuel is used.

First, referring to FIG. 4, the behavior at the cold start is described. Although the heater ON flag Fh and the restart flag Fr are reset to "0" immediately after the key is turned ON, the heater ON flag Fh is immediately set to "1" because the cooling water temperature Tw is a low temperature which is less than the engine start possible water temperature value $T_{DP}$ preset according to the alcohol concentration Da. As a result, the fuel heating control is started by the delivery pipe heater 14. During the heater ON duration time $TI_{oc}$ according to the alcohol concentration Da from the start of the fuel heating control, the fuel is heated to increase the fuel temperature Tf. Upon termination of the fuel heating control, the heater ON flag Fh is reset to "0".

The start time fuel injection amount Pt is computed from the basic injection amount Pc, the alcohol correction coefficient Pa, the heated fuel temperature correction coefficient Pk, and the restart time correction coefficient Pr. The fuel injection and the starter motor drive are started to start the engine start. Since the restart flag Fr is "0" at this time, the restart time correction coefficient Pr is 1, and therefore the injection amount is not reduced. Therefore, by setting the fuel injection amount Pt according to the heated fuel temperature Tf, the cooling water temperature Tw, and the alcohol concentration Da, the fuel injection amount is determined to be suited for the volatile state of the fuel. Accordingly, the fuel injection amount when the fuel is heated is determined appropriately to improve the cold startability.

Next, the behavior at the restart is described referring to FIG. 5. Here, the "restart" means the next start when an engine start failure occurs due to the interruption of the engine start by a user, the start failure at low temperature, an error in alcohol concentration estimation value, or the like. When the first engine start is started, the fuel temperature Tf drops to be equal to the cooling water temperature Tw because the heated fuel is used. Thereafter, however, when the engine start failure occurs to bring about an engine failure state, the restart flag Fr is set to "1". Since the cooling water temperature Tw is a low temperature less than the engine start possible water temperature value $T_{DP}$ preset according to the alcohol concentration Da, the fuel heating control is started again. After the end of the fuel heating, the basic injection amount Pc, the alcohol correction coefficient Pa, the heated fuel temperature correction coefficient Pk, and the restart time correction coefficient Pr are computed. However, since the volatile state of the fuel in the intake port and the cylinder is ameliorated by the previous start, the restart time correction coefficient Pr is computed according to the start time fuel injection amount Pr at the previous start, the fuel temperature Tf, and the cooling water temperature Tw (more specifically, fuel temperature Tf after the fuel heating at the restart, and the cooling water temperature Tw at the restart). A value of the restart time correction coefficient Pr is larger than 0 and equal to or smaller than 1. Therefore, in comparison with the start time fuel injection amount Pr for the previous start, the start time fuel injection amount Pt for the restart is reduced to prevent the startability from being deteriorated due to the overrich condition.

For the start time fuel injection amount Pt in FIGS. 4 and 5, a slope at the start indicates an appropriate injection amount at the start according to the fuel temperature (vaporized state). A hatched area of FIG. 5 indicates a reduction in the fuel injection amount by the restart time correction coefficient Pr.

In the present invention, the start time fuel injection amount Pr is computed as a product of the basic injection amount Pc, the alcohol correction coefficient Pa, the heated fuel temperature correction coefficient Pk, and the restart time correction coefficient Pr in the above-mentioned Formula (1). However, the same effects can also be obtained by an addition computation as expressed by Formula (2).

$$Pt=Pc+Pa+Pk+Pr \quad (2)$$

More specifically, Pt=Pc(Tw)*Pa(Da)*Pk(Tf, Tw, Da)*Pr(Pt, Tf, Tw) is established (for example, Pc(Tw) means Pc determined according to Tw, and * indicates a predetermined computation corresponding to one of multiplication and addition).

Moreover, in Formula (2), zero is set as the lower limit value of each of the alcohol correction coefficient Pa and the heated fuel temperature correction coefficient Pk, whereas zero is set as an upper limit value of the restart time correction coefficient Pr.

What is claimed is:

1. A start control apparatus for an internal combustion engine, comprising:
   a heater for heating a fuel to be supplied to the internal combustion engine;
   fuel heating control means for energizing said heater when a cooling water temperature is less than an internal combustion engine start possible water temperature value to heat the fuel; and
   start time fuel setting means for setting a start time fuel injection amount of the internal combustion engine according to a fuel temperature after the fuel is heated by said fuel heating control means, an alcohol concentration, and the cooling water temperature.

2. The start control apparatus for an internal combustion engine according to claim 1, further comprising restart time fuel correction means for setting a restart time correction coefficient so as to reduce the start time fuel injection amount according to the start time fuel injection amount at a previous start, the fuel temperature after the fuel is heated at a restart, and the cooling water temperature at the restart when the internal combustion engine is restarted,
   wherein said start time fuel setting means reduces the start time fuel injection amount by the restart time correction coefficient to set the obtained start time fuel injection amount, at the restart of the internal combustion engine.

3. The start control apparatus for an internal combustion engine according to claim 2, wherein said fuel heating control means sets the internal combustion engine start possible water temperature value according to the alcohol concentration.

4. The start control apparatus for an internal combustion engine according to claim 3, wherein said fuel heating control means energizes said heater during a heater ON duration time according to the cooling water temperature and the alcohol concentration.

5. The start control apparatus for an internal combustion engine according to claim 2, wherein said fuel heating control means energizes said heater during a heater ON duration time according to the cooling water temperature and the alcohol concentration.

6. The start control apparatus for an internal combustion engine according to claim 1, wherein said fuel heating control means sets the internal combustion engine start possible water temperature value according to the alcohol concentration.

7. The start control apparatus for an internal combustion engine according to claim 6, wherein said fuel heating control means energizes said heater during a heater ON duration time according to the cooling water temperature and the alcohol concentration.

8. The start control apparatus for an internal combustion engine according to claim 1, wherein said fuel heating control means energizes said heater during a heater ON duration time according to the cooling water temperature and the alcohol concentration.

* * * * *